United States Patent
Hotelling

(10) Patent No.: US 6,929,391 B2
(45) Date of Patent: Aug. 16, 2005

(54) LIGHT GUIDE PANEL AND METHOD OF USE

(75) Inventor: Steven Porter Hotelling, San Jose, CA (US)

(73) Assignee: Apple Computer, Inc., Cupertino, CA (US)

(*) Notice: Subject to any disclaimer, the term of this patent is extended or adjusted under 35 U.S.C. 154(b) by 22 days.

(21) Appl. No.: 10/622,266

(22) Filed: Jul. 17, 2003

(65) Prior Publication Data

US 2005/0024843 A1 Feb. 3, 2005

(51) Int. Cl.[7] ................................................. F21V 7/04
(52) U.S. Cl. ....................... 362/612; 362/554; 362/560; 362/89; 362/240; 362/245; 362/311; 362/330; 362/800
(58) Field of Search ...................... 362/31, 554, 555, 362/560, 89, 240, 243, 245, 311, 330, 800

(56) References Cited

U.S. PATENT DOCUMENTS

| | | | |
|---|---|---|---|
| 5,295,216 A | 3/1994 | Halter | |
| 6,322,229 B1 | 11/2001 | Chan et al. | |
| 6,361,180 B1 | 3/2002 | Iimura | |
| 6,364,497 B1 | 4/2002 | Park et al. | |
| 6,402,335 B1 | 6/2002 | Kalantar et al. | |
| 6,498,631 B2 | 12/2002 | Natsuyama | |
| 6,513,943 B2 | 2/2003 | Fukuyoshi | |
| 2003/0058632 A1 * | 3/2003 | Maeda et al. | 362/31 |
| 2004/0008505 A1 * | 1/2004 | Chiang | 362/31 |
| 2004/0017688 A1 * | 1/2004 | Liu | 362/555 |

* cited by examiner

Primary Examiner—Sandra O'Shea
Assistant Examiner—Sharon Payne
(74) Attorney, Agent, or Firm—Sawyer Law Group LLP

(57) ABSTRACT

A light guide panel is disclosed. The panel comprises a plate for dispersing light and at least one light-emitting diode (LED) coupled to the plate for providing the dispersed light. When the panel is coupled to a keyboard, the at least one LED is under a portion of the keyboard such that when the at least one LED is illuminated, the light from the LED does not distract a user. Accordingly, by strategically placing LEDs within the panel and providing the LEDs under appropriate portions of the keyboard, the device utilizing the keyboard can be smaller than when a conventional light guide panel is utilized. In addition, a further improvement in illumination is provided when a mechanism is provided which reflects light escaping from the edges of the panel back into the panel.

20 Claims, 3 Drawing Sheets

300

400

LIGHT GUIDE PANEL AND METHOD OF USE

FIELD OF THE INVENTION

The present invention relates generally to the light guide panels and more particularly to an improved light guide panel utilized with display devices.

BACKGROUND OF THE INVENTION

Light guide panels are utilized in keyboard assemblies to backlight the keypads of the keyboard. Typically, such light guide panels utilize a bundle of optical fibers to backlight the keyboard assembly. FIG. 1 is a simplified block diagram of a conventional light guide panel 10. As is seen, an optical fiber bundle 12 is provided there within. The fiber bundle 12 receives light via a ferrule 14. The light for illuminating the fiber bundle is provided via at least one light emitting diode (LED) 16.

When LED 16 is activated, a fiber-mat 18 is illuminated to provide backlighting for the keyboard. The top surface of the fiber-mat 18 is abraded to let a controlled amount of light emit from top surface. The top surface of the fiber-mat 18 is abraded to provide a uniform distribution of light out of the top surface. Much light is lost out of the end of the fiber-mat 18, which is not recaptured.

In addition to the inefficient lighting issues associated with conventional light guide panels, there is also a problem with the size of the panel when utilizing such a panel. As is seen, in the conventional panel 10, each fiber of the fiber bundle 12 must bend at with at least a minimum curvature value to allow light to be provided to the particular fiber. As a result, the radius of curvature shown at 19 must be at least some minimum value to allow for light to come in. For example, for an optical fiber bundle that radius must be 0.5 inch or so to allow for enough light to be brought in to illuminate the fiber mat 10.

Accordingly, this 0.5 inch of radius of curvature adds a ½0.5 inch of width onto the panel 10 in the direction, as is shown. As is well known, it is desirable to reduce the size of a keyboard, especially for portable devices, in any way possible. Hence, providing a light guide panel which does not increase the size of the keyboard assembly is desirable.

Accordingly, what is needed is a light guide panel that has increased illumination over conventional light guide panels when in use but does not add to or increase the size of the keyboard. The system must be easy to use, compatible with existing devices and cost effective. The present invention addresses such a need.

Another common technique for providing backlighting is to use a light-guide panel (clear sheet of plastic with texture or printed ink to disperse the light as needed. However, in the existing light guide panels, the sources for illumination are placed beyond the perimeter of the lighted area. This increases the overall form-factor of the light guide panel and is undesirable.

SUMMARY OF THE INVENTION

A light guide panel is disclosed. The panel comprises a plate for dispersing light and at least one light-emitting diode (LED) coupled to the plate for providing the dispersed light. When the panel is coupled to a keyboard, the at least one LED is under a portion of the keyboard such that when the at least one LED is illuminated, the light from the LED does not distract a user. Accordingly, by strategically placing LEDs within the panel and providing the LEDs under appropriate portions of the keyboard, the device utilizing the keyboard can be smaller than when a conventional light guide panel is utilized. In addition, a further improvement in illumination is provided when a mechanism is provided which reflects light escaping from the edges of the panel back into the panel.

DETAILED DESCRIPTION

The present invention relates generally to the light guide panels and more particularly to an improved light guide panel utilized with display devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A light guide panel in accordance with the present invention comprises a plate for dispersing light and a plurality of light emitting diodes coupled to the plate, wherein the panel is coupled to the keyboard, the plurality of light emitting diodes are under a portion of the keyboard such that the light from the LEDs does not distract a user. In so doing, the form factor of the light guide panels can be smaller than conventional light guide panels and more light is emitted thereby. To further describe the features of the present invention, refer now to the following description of this invention with the accompanying drawing.

Figure 1:
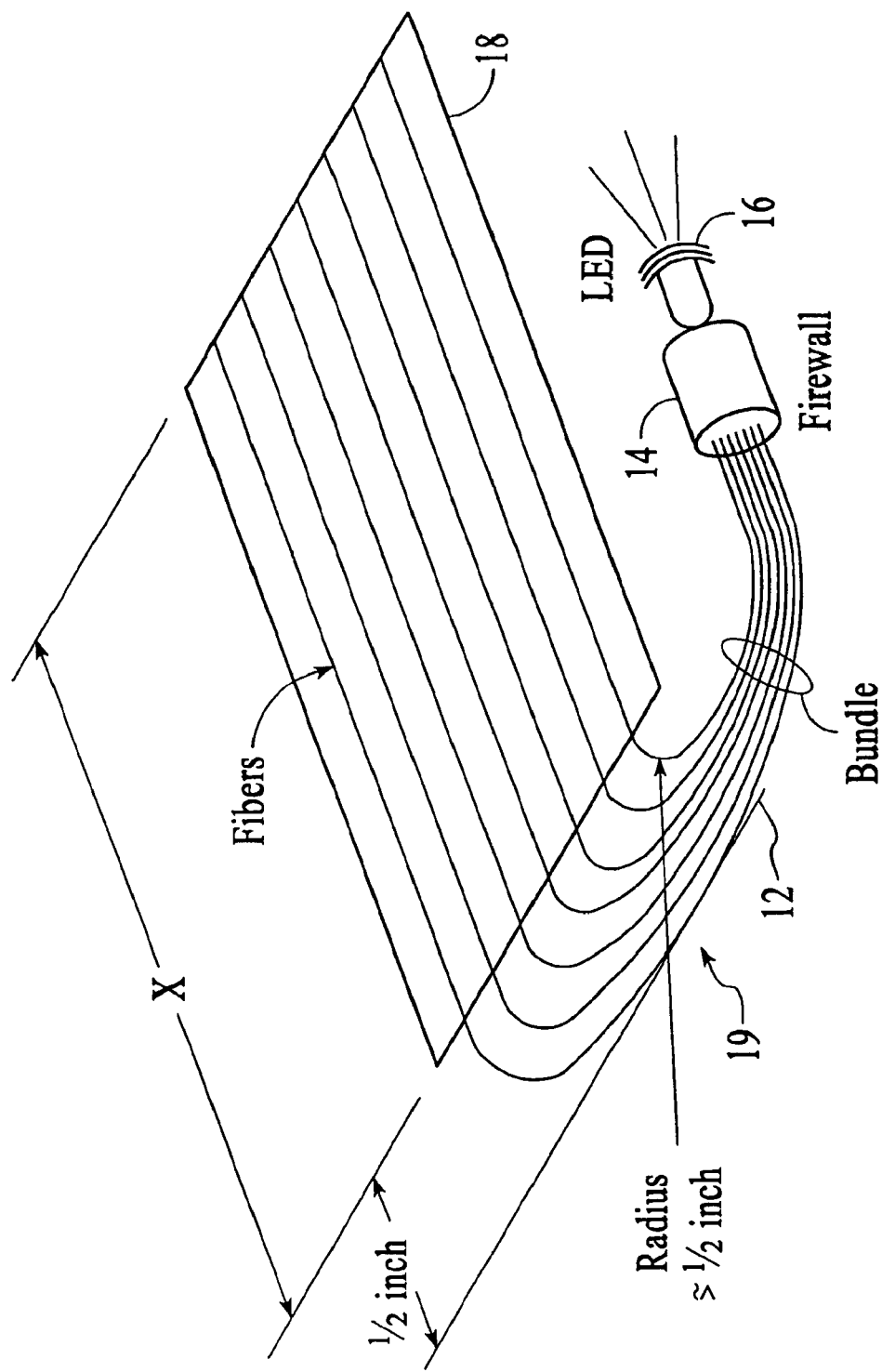
FIG. 1 is a simplified block diagram of a conventional light guide panel.
Figure 2:
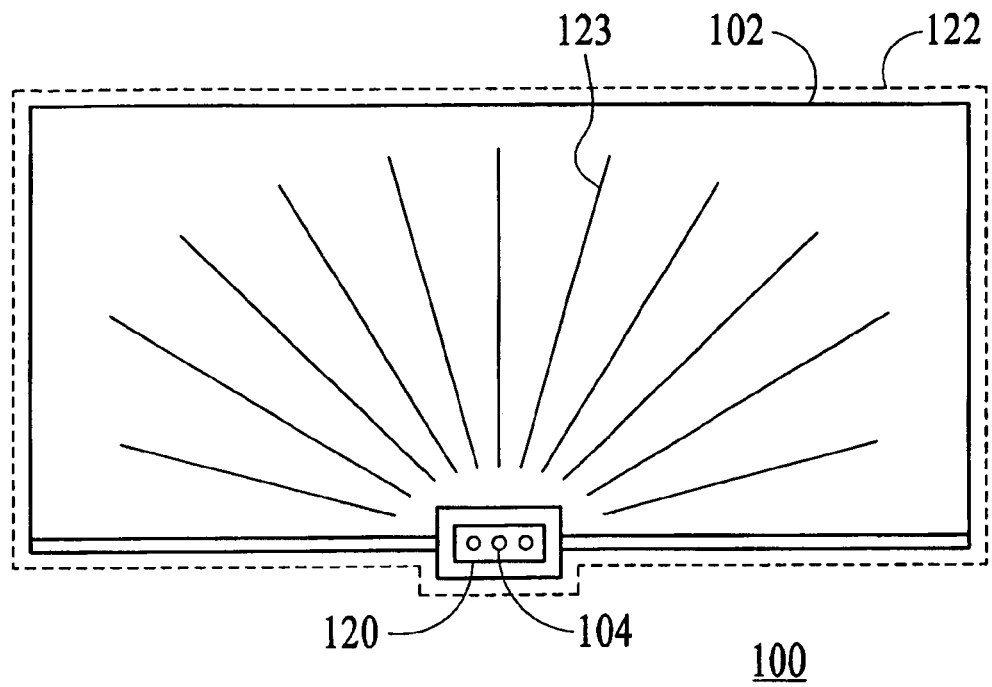
FIG. 2 illustrates a first embodiment of a light guide panel in accordance with the present invention.

FIG. 2 illustrates a first embodiment of a light guide panel 100 in accordance with the present invention. The light guide panel 100 includes a plate 102. The plate 102 includes a plurality of optical fibers 123 therein. The light guide panel 100 further includes a plurality of light emitting diodes (LEDs) 104 coupled to the plate 102 and which provide light to the optical light guide panel 123 to backlight the keyboard. In this embodiment, the LEDs 104 are under the opaque space bar 120 (shown in outline form) of the keyboard 122 (also shown in outline form). In so doing, there are no bright spots on the keyboard when the LEDs 104 are illuminated. By providing the LEDs 104 directly within the plate 102 rather than through the fiber optic bundle as in the conventional light guide panel 10 of FIG. 1, the size of the light guide panel 100 is reduced, and in addition, the illumination is improved.

In the embodiment of FIG. 2, the space bar 120 is used to prevent bright spots. However, one of ordinary skill in the art recognizes that there could be a variety of other places that the LEDs could be located and their use would be within the spirit and scope of the present invention. The key feature is that the LEDs are under a portion of the keyboard that will not distract a user.

Figure 3:
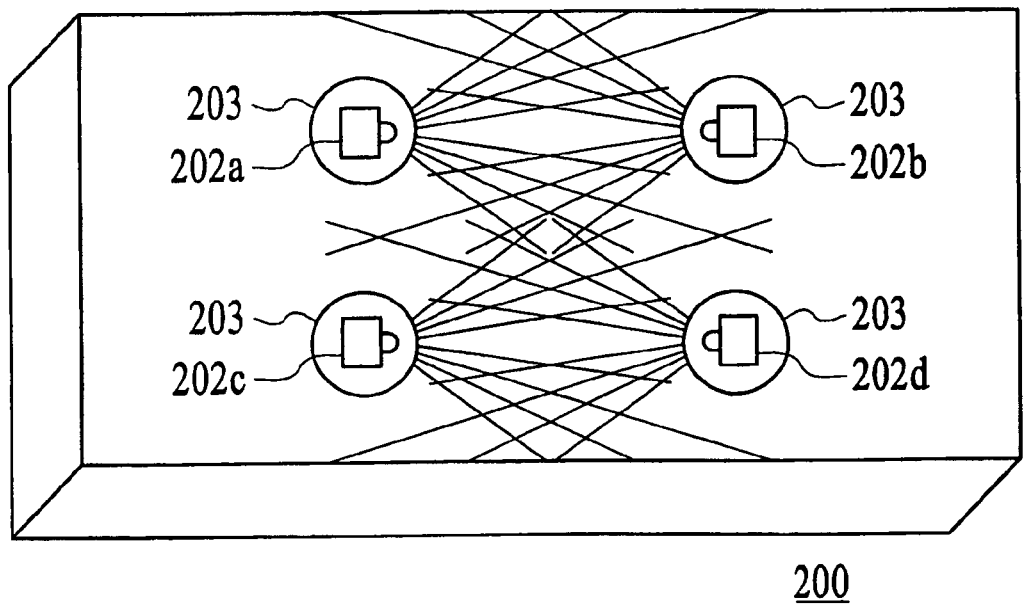
FIG. 3 illustrates a second embodiment of a light guide panel in accordance with the present invention.

FIG. 3 illustrates a second embodiment of a light guide panel 200 in accordance with the present invention. Four LEDs 202a-202d are located on specific points of a light guide panel 202 with opaque portions 203 there over. By strategically placing the LEDs in the appropriate place there is a more even distribution of light. The LEDs could be placed, for example, under a logo, a number keypad or other appropriate portion of the keyboard. In so doing, there may be a bright spot, but it will not distract the user. It should be understood that although four LEDs are shown in this figure, one of ordinary skill in the art recognizes that any number of LEDs could be utilized and their use would be within the spirit and scope of the present invention.

Figure 4A:
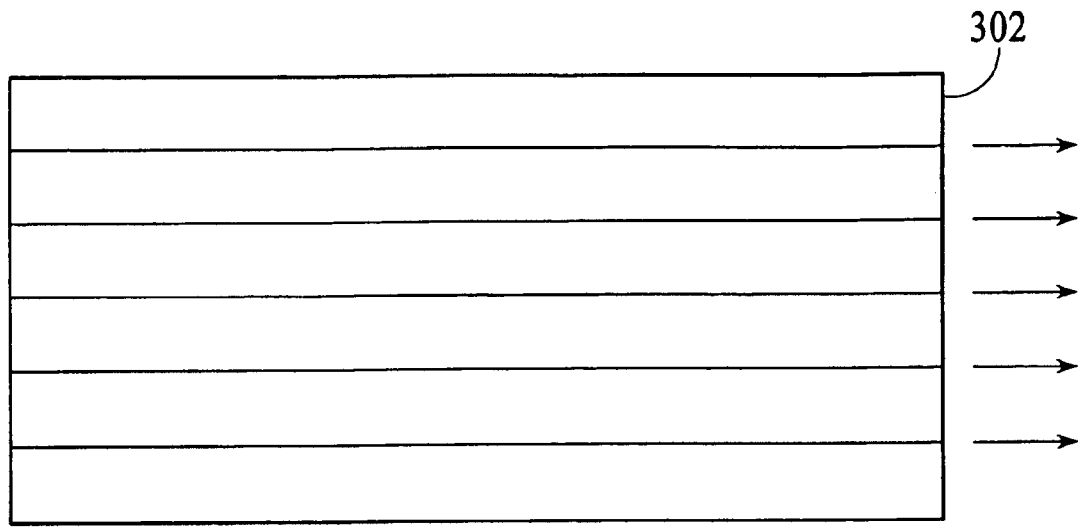
FIG. 4A illustrates a conventional light guide panel.

To further improve upon the illumination characteristics of the light guide panel, a system and method in accordance with the present invention includes a mechanism for increasing the total usage of light within the light guide panel and decreasing wasted light emission. Referring now to FIG. 4A, which is a simplified illustration of a conventional light guide panel 300, the light escapes at the ends of the panel based on the edges being straight thereon, and including no means to reflect the escaping light back into the panel. With the ends 302 being straight, the light, instead of being reflected in any fashion, will simply be transmitted out the ends 302 of the panel 300.

Figure 4B:
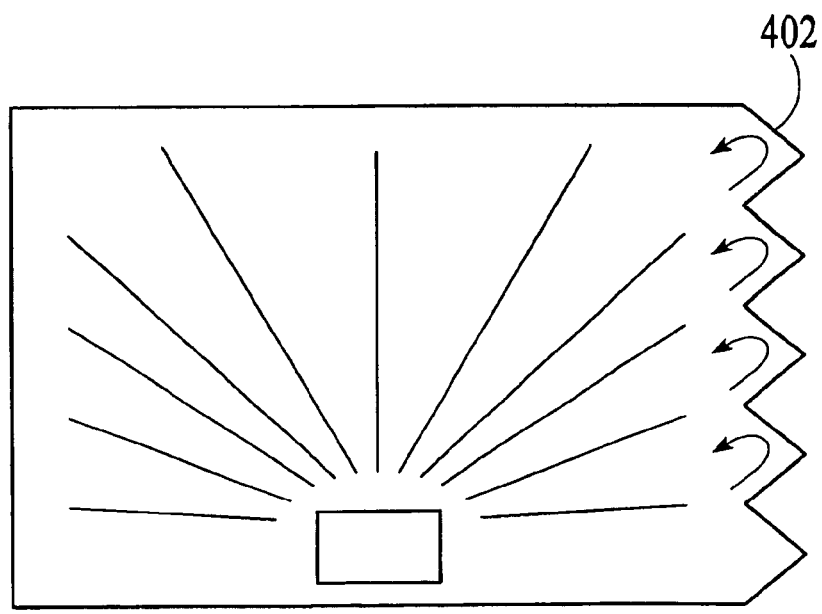
FIG. 4B illustrates an embodiment of the light guide panel in accordance with the present invention, in which the ends of the panel appear as jagged.

In a system and method in accordance with the present invention, as seen in FIG. 4B, the ends 402 of the panel 400 are jagged in appearance (the jagged ends are exaggerated). Through reflection of the light from the jagged ends, the light is reused which allows for more illumination since the total internal reflection value is greater. There are a variety of mechanisms that could be utilized to make the ends of the panel reflect the light back into the panel. Another method for reflecting the light back into the panel is to provide sheet metal flanges (which may be inexpensively manufactured as part of the keyboard metal base plate) which are parallel to the edges of the light guide panel. The light escaping from the panel is reflected off of the sheet metal surfaces and back into the light guide panel.

Accordingly, the system that utilizes a mechanism that optimizes the reflection at the edges of the panel, in combination with the LEDs being strategically placed will provide for a smaller form factor for the keyboard assembly as well as an improvement in light and illumination.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A light guide panel comprising:
a plate for dispersing light, wherein the plate includes a plurality of optical fibers for dispersing light, the plurality of optical fibers being completly within the plate; and
at least one light-emitting diode (LED) coupled to the plate for providing the dispersed light, wherein when the plate is coupled to a keyboard, the at least one LED is located under a portion of the keyboard such that when the at least one LED is illuminated, the light from the at least one LED does not distract a user.

2. The light guide panel of claim 1 wherein the portion comprises an opaque portion.

3. The light guide panel of claim 1 wherein the at least one LED comprises a plurality of LEDs.

4. The light guide panel of claim 3 wherein the plurality of LEDs are strategically placed to provide for even distribution of light.

5. The light guide panel of claim 1 wherein there is a mechanism for reflecting light which escapes at the edge of the plate back into the plate.

6. The light guide panel of claim 5, wherein the mechanism comprises jagged edges on an end of the plate.

7. The light guide panel of claim 2 wherein the opaque portion comprises a spacebar of the keyboard.

8. The light guide panel of claim 2 wherein the opaque portion comprises a plurality of opaque portions on the keypads.

9. A keyboard assembly comprising:
a keyboard; and
a light guide panel coupled to a keyboard, the light guide panel comprising a plate for providing the dispersed light and at least one LED coupled to the plate for providing the dispersed light, wherein the plate includes a pluality of optical fibers for dispersing light, wherein the plurality of optical fibers being completly within the plate, wherein when the panel is coupled to a keyboard, the at least one LED is located under a portion of the keyboard such that when the at least one LED is illuminated, the light from the at least one LED does not distract a user.

10. The keyboard assembly of claim 9 wherein the portion comprises an opaque portion.

11. The keyboard assembly of claim 9 wherein the plate includes a clear sheet of material with a printed dot pattern for dispersing light.

12. The keyboard assembly of claim 9 wherein the at least one LED comprises a plurality of LEDs.

13. The keyboard assembly of claim 12 wherein the plurality of LEDs are strategically placed to provide for even distribution of light.

14. The keyboard assembly of claim 9 wherein the plate includes a mechanism for reflecting light which escapes at the edge of the plate back into the plate.

15. The keyboard assembly of claim 14 wherein the mechanism comprises jagged edges on an end of the plate.

16. The keyboard assembly of claim 10 wherein the opaque portion comprises a spacebar of the keyboard.

17. The keyboard assembly of claim 10 wherein the opaque portion comprises a plurality of opaque portions on the keypads.

18. A light guide panel comprising:
a plate for dispersing light, wherein the plate includes a plurality of optical fibers, the plurality of optical fibers being completly within the plate, wherein the plate includes a mechanism for reflecting light which escapes at the edge of the plate back into the plate; and
a plurality of light-emitting diodes (LEDs) coupled to the plate for providing the dispersed light, wherein when the plate is coupled to a keyboard, the plurality of LEDs are under portions of the keyboard such that when the plurality of LEDs are illuminated, the light from the plurality of LEDs does not distract a user.

19. The light guide panel of claim 18 wherein the portions comprise an opaque portion.

20. The light guide panel of claim 18 wherein the mechanism comprises jagged edges on an end of the plate.

* * * * *